United States Patent [19]

Priou

[11] Patent Number: 5,665,850
[45] Date of Patent: Sep. 9, 1997

[54] POLYMERIC ORGANOMETALLIC PHOTOINITIATORS AND THE CATIONICALLY CROSSLINKABLE POLYORGANOSILOXANE COMPOSITIONS WHICH COMPRISE THEM

[75] Inventor: Christian Priou, Villeurbanne, France

[73] Assignee: Rhone-Poulenc Chimie, Courbevoie, France

[21] Appl. No.: 749,938

[22] Filed: Nov. 14, 1996

Related U.S. Application Data

[62] Division of Ser. No. 380,038, Jan. 30, 1995, Pat. No. 5,626,968.

[30] Foreign Application Priority Data

Jan. 31, 1994 [FR] France .................................. 94 01239

[51] Int. Cl.⁶ .................................................. C08G 77/06
[52] U.S. Cl. ................................ 528/31; 528/15; 528/40; 528/9; 556/9; 556/11; 556/12
[58] Field of Search ......................... 528/15, 31, 40, 528/9; 556/9, 11, 12

[56] References Cited

U.S. PATENT DOCUMENTS

| | | | |
|---|---|---|---|
| 4,450,360 | 5/1984 | Crivello et al. | 260/440 |
| 4,600,484 | 7/1986 | Drahnak | 204/157.74 |
| 4,921,589 | 5/1990 | Yates et al. | 204/157.5 |
| 4,963,470 | 10/1990 | Klingert et al. | 430/201 |
| 5,064,802 | 11/1991 | Stevens et al. | 502/155 |
| 5,071,808 | 12/1991 | Antberg et al. | 502/107 |

FOREIGN PATENT DOCUMENTS

| | | |
|---|---|---|
| 109851 | 5/1984 | European Pat. Off. . |
| 0270490 | 6/1988 | European Pat. Off. . |
| 0464706 | 1/1992 | European Pat. Off. . |
| 2135984 | 2/1972 | Germany . |
| 4110793 | 4/1992 | Germany . |

*Primary Examiner*—Margaret W. Glass
*Attorney, Agent, or Firm*—Andrew M. Solomon

[57] ABSTRACT

Processes of preparing polymeric photoinitiators are disclosed. The polymers are prepared by either a hydrosilation reaction of a SiH containing siloxane or a ring opening reaction of an epoxy functional siloxane. The resulting polymeric photoinitiators are cationic polymers consisting of organometallic complex salts which are grafted onto a polyorganosiloxane backbone.

6 Claims, No Drawings

POLYMERIC ORGANOMETALLIC PHOTOINITIATORS AND THE CATIONICALLY CROSSLINKABLE POLYORGANOSILOXANE COMPOSITIONS WHICH COMPRISE THEM

This application is a division of application Ser. No. 08/380,038 filed Jan. 30, 1995 which application is now U.S. Pat. No. 5,626,968.

The first subject of the present invention is new polymerization cationic photoinitiators consisting of organometallic complex salts which are grafted onto a polyorganosiloxane skeleton. The second subject of the invention is the processes for the preparation of these organometallic photoinitiators grafted onto a polyorganosiloxane skeleton. Additionally, a third subject of the invention is compositions based on a polyorganosiloxane containing catonicallly crosslinkable functional groups and on an effective amount of the said grafted organometallic photoinitiator. Finally, a fourth subject of the invention is the use of the said compositions in the fields, for example, of anti-adhesion paper, of the encapsulation of electronic components and of the production of silicone elastomers.

It is known to use, for the production of coatings, compositions based on a prepolymer containing (an) epoxy functional group(s) to which is added, in order to carry out the crosslinking, a cationic polymerization photoinitiator salt consisting of an onium salt (cf. especially U.S. Pat. No. 4,450,360, U.S. Pat. No. 4,576,999) or a ferrocenium salt (cf. especially EP-A-203,829).

It has been observed that photoinitiators in which the anionic entity is chosen, for example, from $BF_4^-$, $PF_6^-$, $AsF_6^-$ or $SbF_6^-$ are not very efficient when they are used to crosslink a silicone polymer containing (an) epoxy functional group(s); this efficiency failing arises from a fairly low reactivity which is related, on the one hand, to the nature of the anion and, on the other hand, to a lack of solubility of the initiator in the matrix to be polymerized. The use of a solvent does not make it possible to overcome this disadvantage when it is desired to produce thin layer coatings, owing to the evaporation of the solvent which is accompanied by the precipitation of the initiator salt in the silicone material; avoidance of the use of a solvent for environmental and safety reasons is also being sought.

One of the essential objects of the present invention is to provide a cationic polymerization photoinitiator derived from organometallic complex salts, the compatibility of which in the polymer matrix to be crosslinked is improved until good solubility of the photoinitiator in the said matrix is obtained, without recourse being had to the use of an additional solvent.

Another object of the invention is to provide a photoinitiator derived from organometallic complex salts with improved compatibility, the preparation of which can be carried out under industrially advantageous conditions.

Another additional object of the invention is to provide a composition based on a polyorganosiloxane and on a cationic polymerization photoinitiator derived from organometallic complex salts, which can be used as it is for producing a coating and which makes it possible especially to crosslink a thin layer of the silicone coating on the substrate to be coated at a high rate compatible with good productivity of the industrial applications envisaged.

These objects and other objects are achieved by the present invention which relates, in its first subject, to new cationic polymerization photoinitiators derived from organometallic complex salts, characterized in that:

they consist of organometallic complex salts grafted onto a polyorganosiloxane skeleton, and they correspond to a linear molecular structure of average formula:

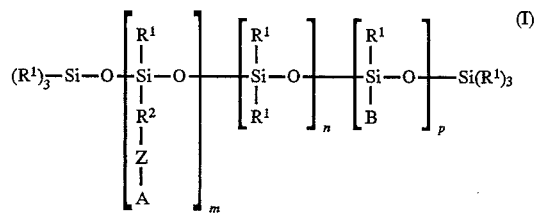

in which:

the various siloxyl units are statistically distributed in the molecular structure;

m is an integer or fractional number ranging from 0.5 to 50;

n is an integer or fractional number ranging from 0 to 500;

p is an integer or fractional number ranging from 0 to 50;

the sum m+n is greater than or equal to 2;

the $R^1$ symbols are identical or different and each represent a linear or branched alkyl radical having from 1 to 6 carbon atoms or a phenyl radical;

the A symbol represents a monovalent residue derived from an organometallic salt of formula (II):

$$(L^1 L^2 M)^{q+} X^-_q \qquad (II)$$

in which formula:

M represents a metal belonging to groups 4 to 10 of the periodic classification as published in Chem. & Eng. News, Vol. 63, No. 5, pages 26–27, 4/02/1985;

$L^1$ represents one ligand or 2 ligands, which are identical or different, bonded to the metal M by π bonds, which ligand(s) is/are chosen from $\eta^3$-allylalkyl, $\eta^5$-cyclopentadienyl and $\eta^7$-cycloheptatrienyl ligands and $\eta^6$-aromatic compounds chosen from optionally substituted $\eta^6$-benzene ligands and compounds having from 2 to 4 condensed rings, each ring being capable of contributing via 3 to 8 π electrons to the valency layer of the metal M;

$L^2$ represents 0 to 3 identical or different ligand(s) bonded to the metal M by σ electrons, which ligand(s) is/are chosen from CO and $NO_2^+$;

$X^-$ is a halogenated complex anion chosen from the $BF_4^-$, $PF_6^-$, $AsF_6^-$, or $SbF_6^-$ anions and their mixtures;

q is a positive integer equal to 1 or 2 which represents the electronic charge of the cationic part of the salt of formula (II);

the valency bond uniting the monovalent symbol A to Z is carried by a carbon atom of the ligand $L^1$ or of one of the two ligands $L^1$ which, in the case of a cyclic ligand, is a cyclic carbon atom;

the $R^2$ symbol represents a divalent organic radical chosen from:

(1) linear or branched alkylene radicals having from 2 to 6 carbon atoms;

(2) radicals of formula:

$$—R^3—O—R^4— \qquad (III)$$

in which the $R^3$ and $R^4$ radicals, which are identical or different, represent linear or branched alkylene radicals having from 1 to 6 carbon atoms;

(3) alkylenecyclohexylene radicals in which the alkylene part, which is linear or branched, contains from 2 to 4 carbon atoms and the cyclohexylene part, which is connected to the Z group, contains an OH group and optionally 1 or 2 alkyl substituents having 1 to 3 carbon atoms;

(4) radicals of formula:

$$-R^5-O-R^6- \qquad (IV)$$

in which the $R^5$ and $R^6$ radicals, which are identical or different, represent linear or branched alkylene radicals having from 1 to 6 carbon atoms and the $R^6$ radical, which is connected to the Z group, or these two radicals is (or are) substituted by one or two OH group(s), the Z symbol represents a connecting group chosen from:
(5) when the $R^2$ symbol has the meanings (1) and (2): the divalent silyl residue of formula:

$$-Si(R^7)_2- \qquad (V)$$

in which the $R^7$ radicals are identical or different and each represent a linear or branched alkyl radical having from 1 to 6 carbon atoms; and (6) when the $R^2$ symbol has the meanings (3) and (4): the —O—CO— radical in which it is the free valency of the CO which is connected to the A residue;

with the additional conditions according to which:
(7) when the $R^2$ symbol has the meanings (1) and (2) and the Z symbol has the meaning (5): p is then a number equal to zero;
(8) when the $R^2$ symbol has the meanings (3) and (4) and the Z symbol has the meaning (6): p is a number equal to zero or a positive number and, in this eventuality, the B symbol then represents the precursor radical of the $R^2$ radical containing, at its end which is opposite that bonded to the silicon atom, an epoxy group resulting from the union of an oxygen atom with two carbon atoms belonging to an alkyl chain or to a cyclohexyl radical.

The new cationic polymerization photoinitiators according to the present invention are preferably the compounds of formula (I) in which:

m is an integer or fractional number ranging from 0.5 to 20;

n is an integer or fractional number ranging from 1 to 100;

p is an integer or fractional number ranging from 0 to 20;

$R^1$ is chosen from methyl, ethyl, n-propyl and phenyl radicals;

The A symbol represents a monovalent residue derived from an organometallic salt of formula (II) in which M is a metal chosen from Cr, Mo, W, Mn, Fe, Re and Co; $R^2$ is chosen from:
(1) linear alkylene radicals having from 2 to 4 carbon atoms;
(3) alkylenecyclohexylene radicals, the linear alkylene part of which contains 2 or 3 carbon atoms and the cyclohexylene part of which contains an OH group;

(4) radicals of formula (IV) in which the $R^5$ and $R^6$ radicals, which are identical or different, represent linear alkylene radicals having from 2 to 4 carbon atoms and the $R^6$ radical, which is bonded to the Z group, is substituted by an OH group;

Z is chosen, according to the abovementioned rule taking into account the meanings of $R^2$, from the silylene residue (5) of formula (V) where the $R^7$ radicals are chosen from methyl, ethyl and n-propyl radicals and the —O—CO— radical (6);

the additional conditions (7) and (8), which have been spoken of above with respect to the general definitions given for the formula (I), also being again adapted within the context of these preferentially given definitions.

In a more preferential way, the new photoinitiators according to the present invention are the compounds of formula (I) belonging to the group of preferred compounds defined above in the structure of which the A symbol represents a monovalent residue derived from an organometallic salt of formula II chosen from:

($\eta^5$-cyclopentadienyl) ($\eta^6$-benzene) $Fe^+$ $X^-$ ($\eta^5$-cyclopentadienyl) ($\eta^6$-naphthalene) $Fe^+$ $X^-$ ($\eta^5$-cyclopentadienyl) ($\eta^6$-toluene) $Fe^+$ $X^-$ ($\eta^5$-cyclopentadienyl) ($\eta^6$-cumene) $Fe^+$ $X^-$ ($\eta^5$-cyclopentadienyl) ($\eta^6$-mesitylene) $Fe^+$ $X^-$ ($\eta$-cyclopentadienyl) ($\eta^6$-1-methylnaphthalene)$Fe^+$ $X^-$ bis($\eta^6$-benzene)$Cr^+$ $X^-$ where the free valency of the monovalent symbol A is carried by an $L^1$ ligand or the one of the 2 $L^1$ ligands which is unsubstituted and $X^-$ is itself chosen from $PF_6^-$, $AsF_6^-$ or $SbF_6^-$ and their mixtures.

Mention my be rode, as specific examples of photoinitiator compounds of formula (I), of the compounds in which:

m is an integer or fractional number ranging from 0.5 to 5;

n is an integer or fractional number ranging from 30 to 50;

p is an integer or fractional number ranging from 0 to 15;

$R^1$ represents a methyl group, the A—Z—$R^2$-substituent is chosen from the groups of formulae;

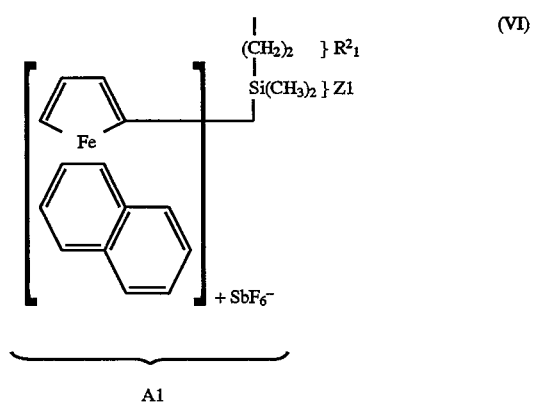

A1

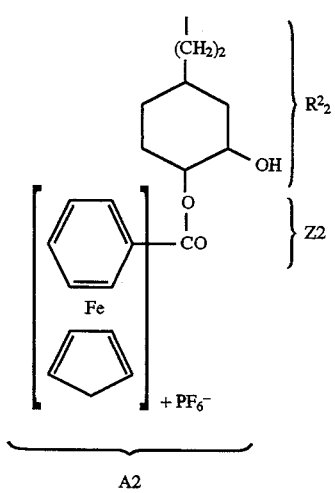

A2

The preparation of the organometallic photoinitiators grafted onto a polyorganosiloxane skeleton of formula (I), which constitutes a second subject of the present invention, can be carried out by applying various processes.

According to a first process which is suited to the preparation of photoinitiator compounds of formula (I) where p=0, $R^2$ has the meanings (1) and (2) and Z is —Si($R^7$)$_2$—, the preparation is carried out from a polyorganosiloxane compound containing (a) hydrogeno functional group(s) of general formula (VIII):

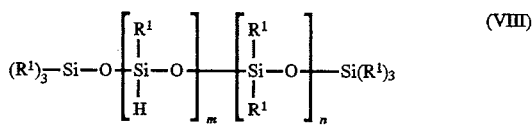

in which the $R^1$, m and n symbols have the general or preferred meanings indicated above for the compounds of formula (I). Such compounds of formula (VIII) are commercially available.

The replacement of the hydrogen atoms of the compound (VIII) by the A—Z—$R^2$— substituent is carried out by reaction of the polyorganosiloxane of formula (VIII) with a compound having an ethylenic unsaturation capable of reacting via a hydrosilylation reaction in the presence of an appropriate catalyst, such as, for example, a platinum-based catalyst.

This compound will therefore be the precursor of the A—Z—$R^2$— substituent which will carry an ethylenic unsaturation at the free end of the hydrocarbon radical bonded to the A—Z— assembly.

Mention may be made, as precursor of the A—Z—$R^2$— substituent, as non-limiting example, of the compound of formula A1—Z1—CH=CH$_2$ (IX) in which the A1 and Z1 symbols have the meanings indicated above with respect to the formula (VI).

The ethylenically unsaturated precursor of the A—Z—$R^2$— substituent can be prepared by linking together, for example, the following stages:

Stage 1: in which a disubstituted ferrocene [2($\eta^5$-cyclopentadienyl)Fe], that is to say carrying the desired alkenyldialkylsilyl group on each ligand, is prepared in the following way: in a first phase, the ferrocene is treated with an alkyllithium, the reaction being carried out in solvent medium and in the presence of an amine-containing complexing agent such as, for example, that described in Org. React., 8, 258 (1954)

and then, in a second phase, the ferrocene disubstituted by a lithium atom thus obtained is reacted with an appropriate alkenyldialkylchlorosilane, the reaction being carried out at room temperature;

Stage 2: in which an exchange reaction of one of the cyclopentadienyl ligands, each substituted by the alkenyldialkylsilyl group, by the desired aromatic ligand is carried out by reacting the di(alkenyldialkylsilyl) substituted ferrocene obtained as a result of Stage 1 with the chosen aromatic compound, the reaction being carried out in the presence of a mixture based, on the one hand, on aluminium chloride, on a metal reducing agent (aluminium) and optionally on titanium tetrachloride and, on the other hand, on an alkali metal salt of the X$^-$ anionic entity chosen. The operating conditions (respective amounts of reactants, choice of solvents, duration, temperature, stirring, and the like) are within the scope of those skilled in the art.

According to a second process which is suited to the preparation of photoinitiator compounds of formula (I) where p is zero or a positive number, $R^2$ has the meanings (3) and (4) and Z is —O—CO—, the preparation is carried out from a polyorganosiloxane compound containing (an) epoxy functional group(s) of general formula (X):

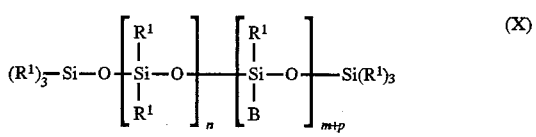

in which the $R^1$, B, m, n and p symbols have the general or preferred meanings indicated above for the compounds of formula (I). Such compounds of formula (X) are products, described especially in FR-A-2,110,115 and FR-A-2,526,800.

The conversion of all or part of the B radicals of the compound (X) into A—Z—$R^2$— substituents is carried out by an opening reaction of the epoxy group (carried by B) by a free COOH functional group carried by the $L^1$ ligand or one of the two $L^1$ ligands of the functionalized organometallic salt which will therefore be the precursor of the A—Z— assembly. This reaction can be carried out in a solvent such as, for example, toluene, THF, methyl isobutyl ketone, ethyl acetate or a methyl isobutyl ketone/acetone mixture and in the presence of a catalyst such as, for example, a tertiary amine; in general, the reaction temperature lies between 60° C. and 120° C.

Mention may be made, as B radicals, as non-limiting examples, of the radicals:

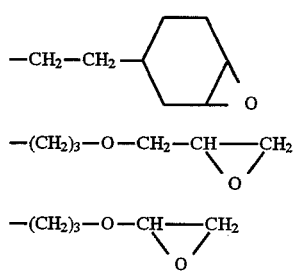

Mention may be made, as organometallic salt containing COOH functionality which is the precursor of the A—Z— assembly, as non-limiting example, of the compound of formula A1—Z2—H (XI) in which the A2 and Z2 symbols have the meanings indicated above with respect to the formula (VII).

The precursor containing COOH functionality of the A—Z— assembly can be prepared by linking together, for example, the following stages:

Stage 1': in which a ferrocenium salt ($\eta^5$-cyclopentadienyl)($\eta^6$-toluene)Fe$^+$ BF$_4^-$ is prepared by reacting ferrocene with toluene, the reaction being carried out in the presence of a mixture based, on the one hand, on aluminium chloride, on a metal reducing agent (aluminium) and optionally on titanium tetrachloride and, on the other hand, on an alkali metal salt of the BF$_4^-$ entity chosen;

Stage 2': in which the methyl radical carried by the toluene ligand of the ferrocenium salt obtained as a result of Stage 1' is oxidized, the oxidation being carried out in water using a chemical oxidizing agent such as, for example, potassium permanganate, this oxidation phase optionally being followed by another phase targeted at exchanging the BF$_4^-$ anion by the PF$_6^-$ or SbF$_6^-$ anion. The operating conditions (respective amounts of reactants, duration, temperature, stirring, and the like) are yet again within the scope of those skilled in the art.

The photoinitiator compounds of formula (I) can in particular be used as crosslinking agent in a polyorganosiloxane composition which can be cationically crosslinked, for example, in a thin layer or in a thick layer.

More precisely, a third subject of the present invention is polyorganosiloxane compositions which can be crosslinked cationically, photochemically or under an electron beam, characterized in that they comprise:

(a) 100 parts of a polyorganosiloxane comprising functional groups of epoxy type;
(b) an effective amount of an organometallic photoinitiator compound of formula (I);
(c) 0 to 50 parts of at least one other ingredient belonging to the family of additives commonly used in this field of the art.

The polyorganosiloxanes (a) are (i) linear or substantially linear and consist of units of formula (XII) terminated by units of formula (XIII) or (2i) cyclic and consist of units of formula (XII):

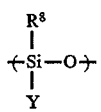
(XII)

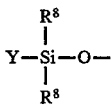
(XIII)

in which formulae:
the R$^8$ symbols are identical or different and represent an optionally substituted, linear or branched, C$_1$–C$_6$ alkyl radical (3,3,3-trifluoropropyl for example), a C$_5$–C$_8$ cycloalkyl radical, an aryl (especially phenyl) radical or a substituted aryl (dichlorophenyl for example) radical, at least 60 mol % of the R$^8$ radicals being methyl radicals;

the Y symbols are identical or different and represent either the R$^8$ group or an organic functional radical of epoxy type which can be cationically crosslinked, each epoxy functional group being connected to an atom of the silicone chain via a divalent radical containing from 2 to 20 carbon atoms and optionally one or a number of heteroatom(s) such as, for example, oxygen; mention may be made, as binding radical, of, for example, the residues to which the epoxy group is attached in the B radicals which have been spoken of before, which are the precursors of the R$^2$ radicals having the meanings (3) and (4) given above; the said polyorganosiloxanes (a) comprising, per mole of polymer, at least one siloxyl unit where Y is an epoxy functional group; preferably, they comprise from 1 to 10 siloxyl units carrying an epoxy functional group.

The epoxy polyorganosiloxanes are described especially in Patents DE-A-4,009,889, EP-A-0,396,130, EP-A-0,355,381, EP-A-0,105,341, FR-A-2,110,115 and FR-A-2,526,800.

The functional epoxy polyorganosiloxanes can be prepared by a hydrosilylation reaction between oils containing Si-H units and functional epoxy compounds such as, for example, 4-vinylcyclohexene oxide or allyl glycidyl ether.

The functional epoxy polyorganosiloxanes generally exist in the form of fluids having a viscosity at 25° C. of 10 to 50,000 mPa·s and preferably of 100 to 600 mPa·s. The viscosity concerned in the present statement is the dynamic viscosity at 25° C., known as the "Newtonian" viscosity, that is to say the dynamic viscosity which is measured in a way known per se, at a sufficiently low shear rate gradient for the viscosity measured to be independent of the rate gradient.

Effective catalytic amount of an organometallic photoinitiator compound (b) of formula (I) is understood to mean, according to the invention, the amount sufficient to initiate crosslinking; this amount, expressed by the amount of monovalent residue A derived from the organometallic salt of formula (II), is generally between 0.1 and 20 parts by weight and most often between 0.5 and 8 parts by weight in order to crosslink 100 parts by weight of crosslinkable polyorganosiloxane.

The compositions according to the invention can additionally contain other ingredients (c) such as, for example, adhesion modulators (linear silicone polymers or resins carrying vinyl, epoxy, vinyl ether or alcohol functional groups), pigments, photosensitizers, fungicidal, bactericidal and antimicrobial agents, corrosion inhibitors or inorganic fillers such as, for example, silica or calcium carbonate.

The compositions according to the invention can be used as they are obtained, without having to be dissolved in an organic solvent. They are useful in a thin layer in the field of anti-adhesive coatings on cellulose materials or paints and in a thick layer for the encapsulation of electric and electronic components, coatings for textiles and for sheathing optical fibres.

They are very particularly advantageous when they are used as such for making a material, such as metal sheets, glass, plastics or paper, non-adhesive to other materials to which they would normally adhere. The composition advantageously has a viscosity not exceeding 15,000 mPa·s and preferably not exceeding 4,000 mPa·s at 25° C.

The invention is thus also targeted, and this constitutes a fourth subject of the invention, at a process which makes it possible to make articles (sheets, for example) non-adhesive to surfaces to which they would normally adhere, which process is characterized in that it consists of applying an amount of composition of the invention generally of between 0.1 and 5 g per m$^2$ of surface area to be coated and in crosslinking the composition by supplying energy, at least part, and preferably all, of which is provided by U.V. radiation.

The U.V. radiation used has a wavelength of between 200 and 400 nanometers and preferably between 254 and 360 nanometers.

The duration of irradiation can be short and it is generally less than one second and is of the order of a few hundredths of a second for low coating thicknesses. The crosslinking achieved is excellent, even in the absence of any heating. Of course, heating between 25° and 100° C. is not ruled out by the invention.

Of course, it is possible to adjust the curing time especially, by the number of U.V. lamps used, by the duration of exposure to the U.V. radiation and by the distance between the composition and the U.V. lamp.

it is also possible to use radiation with a wavelength greater than 400 nanometers lying in the visible range.

The compositions are applied using devices capable of uniformly depositing small amounts of liquids. For this purpose, it is possible to use, for example, the device known as "sliding helio" containing, in particular, two superimposed cylinders: the role of the bottommost cylinder, which is immersed in the coating tank containing the composition, is to impregnate the uppermost cylinder with a very thin layer and the role of the uppermost cylinder is then to deposit the desired amounts of composition with which it is impregnated on the paper, such quantitative charging being obtained by adjusting the respective speed of the two cylinders which rotate in opposite directions with respect to one another.

The amounts of composition deposited on the substrates are variable and most often range between 0.1 and 5 g/m$^2$ of treated surface area. These amounts depend on the nature of the substrates and on the desired anti-adhesion properties. They are most often between 0.5 and 1.5 g/m$^2$ for non-porous substrates.

The compositions of the invention can also be used in thicker layers (>5 micrometers) as a tropicalization varnish (conformal coating), the role of which is to electrically insulate the components and the circuits of an assembly and to keep them sheltered from the external environment and from the mechanical factors which can compromise the behaviour of the assembly. The said compositions can then be applied by spraying or by immersion or alternatively by brushing; the composition thicknesses deposited depend on the method of application chosen and most often vary from 5 micrometers to a few tenths of millimeters; a subsequent polymerization stage may, in certain cases, be necessary; the latter can be accomplished by a heat treatment.

Another subject of the present invention is articles (sheets, for example) consisting of a solid material (metal, glass, plastic or paper), one surface at least of which is coated with the above-described photocrosslinked composition or composition crosslinked under an electron beam.

The following examples are given by way of illustration and cannot be regarded as a limit of the field and spirit of the invention.

EXAMPLE 1

Preparation of a polymeric photoinitiator according to the invention of formula (I) where p is a positive number, R has the meaning (3) and Z is —O—CO— from a polyorganosiloxane compound containing epoxy functional groups of formula (X) and from the organometallic salt containing COOH functionality of formula: ($\eta$5-cyclopentadienyl)($\eta^6$-1-carboxybenzene) Fe$^-$ PF$_6^-$.

1) Preparation of the tolylferrocenium salt of formula: ($\eta^5$-cyclopentadienyl)($\eta^6$-toluene)Fe$^+$ BF$_4^-$ from ferrocene and toluene:

Ferrocene (37.2 g, 0.2 mol), aluminium chloride (33.4 g, 0.25 mol), aluminium powder (1.08 g; 0.04 mol) and toluene (212 ml, 2 mol) are charged to a 500 ml, three-necked, round-bottomed flask equipped with a mechanical stirrer, a reflux condenser and a dropping funnel. The mixture is stirred and is heated at 60° C. for 30 min. Titanium chloride TiCl$_4$ (14 ml, 0.1 mol) is added dropwise over 30 min at this temperature. The reaction mixture is then brought to reflux of the toluene for 2 hours. The temperature is allowed to return to room temperature and the crude reaction mixture is carefully poured into 300 ml of hydrochloric acid containing 6% by weight of pure HCl in water (acid hydrolysis). The whole mixture is stirred for 30 min at a temperature of 5° C. Hydrogen peroxide (concentration=30% by weight, 6 ml) is then added and filtration is then carried out in order to remove the titanium oxide formed. The mixture is settled and the phases are separated. The aqueous phase is washed three times with hexane (100 ml) and then a saturated NaBF$_4$ (22 g) solution is added. The ferrocenium salt precipitates. It is recovered by filtration and is then dried under vacuum. A more rigorous purification can be carried out by recrystallizing from an acetone/water mixture. The reaction yield is 45%.

2) Oxidation of the tolylferrocenium salt:

The above tolylferrocenium salt (7.1 g, 0.023 mol), potassium permanganate (18.45 g, 0.118 mol) and water (520 ml) are charged to a 1000 ml, three-necked, round-bottomed flask equipped with a mechanical stirrer, a reflux condenser and a dropping funnel. This mixture is brought to reflux of the water for 20 hours and is then left to return to room temperature. A filtration is then carried out in order to remove the manganese oxide formed during the reaction. 7 ml of concentrated hydrochloric acid are added in order to bring the pH to 2. 200 ml of water are then evaporated under reduced pressure and the reaction mixture is then washed with three hexane fractions (100 ml). A saturated potassium hexafluorophosphate solution (4.3 g of KPF$_6$) is added. The tolylferrocenium salt containing COOH functionality precipitates. It is recovered by filtration and is then dried under vacuum. The purification of this salt is carried out by recrystallizing from an acetone/ether mixture. 6.9 g of tolylferrocenium salt containing COOH functionality are recovered, which corresponds to a yield of 78%.

3) Grafting of the tolylferrocenium salt containing COOH functionality onto the epoxidized polyorganosiloxane compound of average formula:

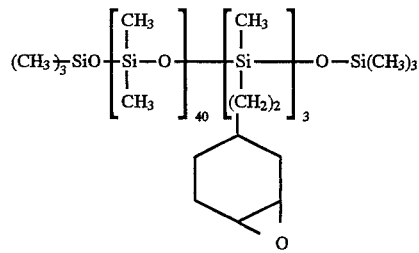

assaying at 91 molar milliequivalents of epoxy functional groups per 100 g of silicone oil:

This reaction must be carried out with the light excluded. 12 g of silicone oil containing epoxide functional groups, the above tolylferrocenium salt (4.23 g, 0.011 mol), methyl isobutyl ketone (MIBK) (15 ml), acetone (4 ml) and four drops of triethylamine are charged to a 50 ml, three-necked, round-bottomed flask equipped with a mechanical stirrer and a reflux condenser. This mixture is brought to a temperature of 100° C. for 4 hours and it is then cooled to room temperature. The solvents and the triethylamine are removed using a rotary evaporator and the residual oil is then filtered in order to remove the unreacted ferrocenium salt. A clear, orange-coloured oil is thus obtained. $^1$H and $^{13}$C NMR analysis shows that 25% of the epoxide functional groups carried by the oil have been opened during the reaction. The photoreactive oil obtained has the average formula:

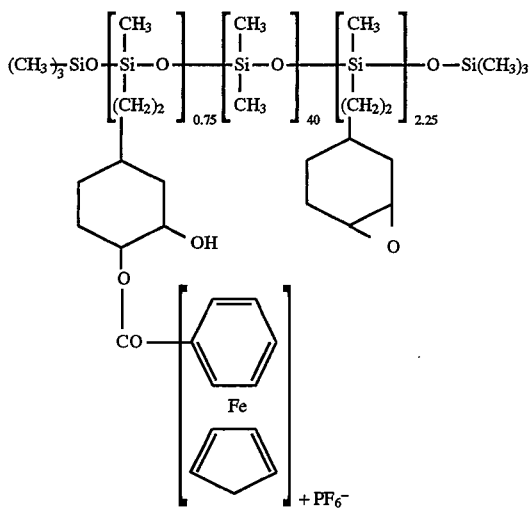

EXAMPLE 2

Photocrosslinking of an epoxidized polyorganosiloxane in thick and thin layers.

The epoxidized polyorganosiloxane compound subjected to crosslinking has the same average formula and structure as those of the silicone oil used in the grafting stage 3) of Example 1.

1) Photocrosslinking in a thick layer:

The photoreactive oil of Example 1 is mixed with the epoxidized silicone oil to be crosslinked. The two oils are perfectly miscible. The mixture (50/50 by weight) is deposited in a dish with a depth of 1 cm and is then exposed for 10 minutes to sunlight. A material is obtained which is crosslinked throughout its thickness.

2) Photocrosslinking in a thin layer:

A 50/50 by weight mixture of the photoreactive oil of Example 1 with the epoxidized silicone oil to be crosslinked is prepared.

The mixture is then deposited with a variable thickness (approximately 1 to 5 g/m²) on glassine paper (Sibille® 9530 marketed by the Company Sibille) by means of an appropriate Mayer® bar (marketed by the Company Erichsen G.B.).

The coated paper is then passed under a Fusion System® F450 U.V. lamp (marketed by the company Fusion) and characterized by:

a wavelength of 360 nm
an absence of electrodes,
excitation by microwaves,
a power of 120 W per cm irradiated.

The thickness of the deposited layer, as well as the number of passages and the progression rate in m/min which are necessary for the layer to be cured, are recorded.

The behaviours as regards crosslinking rate are compared with those obtained by using the photoreactive oil alone for carrying out the coating (Comparative Tests a and b). The results obtained are recorded in the following table:

| Example/Test | Thickness of the layer | Progression rate | Number of passages |
|---|---|---|---|
| Ex. 2—2 | 1 μm | 7.5 m/min | 1 |
| Test a | 5 μm | 3 m/min | 4 |
| Test b | 1 μm | 3 m/min | 2 |

What is claimed is:

1. A process for preparing a photoinitiator of formula (I)

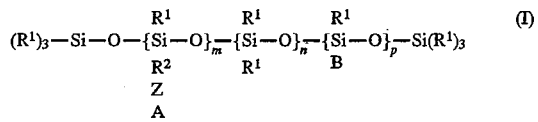

wherein:

m is an integer or fractional number ranging from 0.5 to 50;

n is an integer or fractional number ranging from 0 to 500;

p equal to 0;

the sum m+n is greater than or equal to 2;

the $R^1$ symbols are identical or different and each represents a linear or branched alkyl radical having from 1 to 6 carbon atoms or a phenyl radical;

the A symbol represents an organometallic salt of formula (II):

$$(L^1L^2M)^{q+}X^-_q \qquad (II)$$

in which formula:

M represents a metal selected from the group consisting of Mn, Cr, Mo, W, Fe, Re and Co;

$L^1$ represents one ligand or 2 ligands, which are identical or different, bonded to the metal M by π bonds, which ligand(s) are selected from the group consisting of $\eta^3$-allylalkyl, $\eta^5$-cyclopentadienyl, $\eta^7$-cycloheptatrienyl and $\eta^6$-aromatic compounds selected from the group consisting of $\eta^6$-benzene ligands and compounds having from 2 to 4 aromatic rings, each ring being capable of contributing 3 to 8 π electrons to the valency layer of the metal M;

$L^2$ represents 0 to 3 identical or different ligand(s) bonded to the metal M by σ electrons, and is selected from the group consisting of CO and $NO_2^+$;

$X^-$ is a halogenated complex anion selected from the group consisting of $BF_4^-$, $PF_6^-$, $AsF_6^-$, and $SbF_6^-$ and mixtures thereof;

q is a positive integer equal to 1 or 2;

the valency bond uniting the monovalent symbol A to Z being carried by a carbon atom of the ligand $L^1$ or one of the two ligands $L^1$;

$R^2$ represents a divalent organic radical selected from the group consisting of:

(1) linear or branched alkylene radicals having from 2 to 6 carbon atoms; and (2) radicals of formula:

in which the $R^3$ and $R^4$ radicals, which are identical or different, represent linear or branched alkylene radicals having from 1 to 6 carbon atoms; and Z is a group of the formula:

in which the $R^4$ radicals are identical or different and each represent a linear or branched alkyl radical having from 1 to 6 carbon atoms when $R^2$ is represented by (1) or (2);

said process comprising the steps of reacting a compound of formula (VIII)

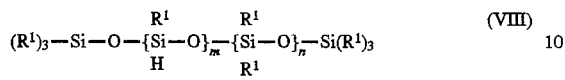

wherein:

$R^1$, m and n have the same meaning indicated above for formula (I), with a precursor of the A—Z—$R^2$— substituent carrying an ethylenic unsaturation at the free end of the hydrocarbon group bonded to the A—Z— assembly by a hydrosilation reaction in the presence of a catalyst to yield a compound of formula (I).

2. The process according to claim 1, wherein m, n, and $R^1$ are as follows:

m is an integer or fractional number ranging from 0.5 to 20;

n is an integer or fractional number ranging from 1 to 100; and $R^1$ is selected from the group consisting of methyl, ethyl, n-propyl and phenyl radicals.

3. The process according to claim 1, wherein A is selected from the group consisting of:

($\eta^5$-cyclopentadienyl) ($\eta^6$-benzene)$Fe^+$ $X^-$;
($\eta^5$-cyclopentadienyl) ($\eta^6$-naphthalene)$Fe^+$ $X^-$;
($\eta^5$-cyclopentadienyl) ($\eta^6$-toluene)$Fe^+$ $X^-$;
($\eta^5$-cyclopentadienyl) ($\eta^6$-cumene)$Fe^+$ $X^-$;
($\eta^5$-cyclopentadienyl) ($\eta^6$-mesitylene)$Fe^+$ $X^-$;
($\eta^5$-cyclopentadienyl) ($\eta^6$-1-methylnaphthalene)$Fe^+$ $X^-$; and bis ($\eta^6$-benzene)$Cr^+$ $X^-$; and wherein $X^-$ is selected from the group consisting of $PF_6^-$, $AsF_6^-$ and $SbF_6^-$ and mixtures thereof.

4. A process for preparing a photoinitiator of formula (I)

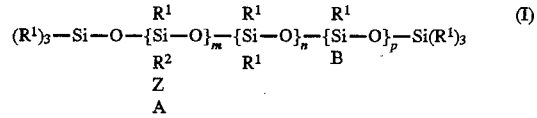

wherein:

m is an integer or fractional number ranging from 0.5 to 50;

n is an integer or fractional number ranging from 0 to 500;

p is an integral or fractional number ranging from 0 to 50;

the sum m+n is greater than or equal to 2;

the $R^1$ symbols are identical or different and each represents a linear or branched alkyl radical having from 1 to 6 carbon atoms or a phenyl radical;

the A symbol represents an organometallic salt of formula (II):

in which formula:

M represents a metal selected from the group consisting of Mn, Cr, Mo, W, Fe, Re and Co;

$L^1$ represents one ligand or 2 ligands, which are identical or different, bonded to the metal M by $\pi$ bonds, which ligand(s) are selected from the group consisting of $\eta^3$-allylalkyl, $\eta^5$-cyclopentadienyl, $\eta^7$-cycloheptatrienyl and $\eta^6$-aromatic compounds selected from the group consisting of $\eta^6$-benzene ligands and compounds having from 2 to 4 aromatic rings, each ring being capable of contributing 3 to 8 $\pi$ electrons to the valency layer of the metal M;

$L^2$ represents 0 to 3 identical or different ligand(s) bonded to the metal M by $\sigma$ electrons, and is selected from the group consisting of CO and $NO_2^+$;

$X^-$ is a halogenated complex anion selected from the group consisting of $BF_4^-$, $PF_6^-$, $AsF_6^-$, and $SbF_6^-$ and mixtures thereof;

q is a positive integer equal to 1 or 2;

the valency bond uniting the monovalent symbol A to Z being carried by a carbon atom of the ligand $L^1$ or one of the two ligands $L^1$;

$R^2$ represents a divalent organic radical selected from the group consisting of:

(3) alkylenecyclohexylene radicals in which the alkylene portion of the radical, which is linear or branched, contains from 2 to 4 carbon atoms and the cyclohexylene portion of the radical, which is connected to the Z group, contains an OH group; and (4) radicals of formula:

in which the $R^5$ and $R^6$ radicals, which are identical or different, represent linear or branched alkylene radicals having from 1 to 6 carbon atoms and wherein the $R^6$ radical is substituted by one or two OH groups;

—Z is —O—CO—

B represents the precusor radical of the $R^2$ radical containing at its end which is opposite to that bonded to the silicon atom, an epoxy group resulting from the union of an oxygen atom with two carbon atoms belonging to an alkyl chain or to a cyclohexyl radical;

said process comprising the steps of converting all or part of the B radicals of a compound of formula (x)

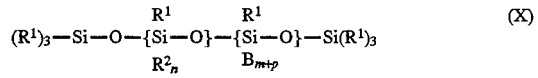

wherein:

$R^1$, B, m, P and n have the same meaning indicated above for formula (I), into A—Z—R— substituents, by an opening reaction of the epoxy group by a free COOH functional group carried by the $L^1$ ligand or one of the two $L^1$ ligands of the organometallic salt which will be therefore the precursor of the A—Z-assembly, to yield a compound of formula (I).

5. The process according to claim 4, wherein m, n, , $R^1$, A, $R^2$ and Z are as follows:

m is an integer or fractional number ranging from 0.5 to 20;

n is an integer or fractional number ranging from 1 to 100; and $R^1$ is selected from the group consisting of methyl, ethyl, n-propyl and phenyl radicals.

6. The process according to claim 4, wherein A is selected from the group consisting of:

($\eta^5$-cyclopentadienyl) ($\eta^6$-benzene)Fe$^+$ X$^-$;
($\eta^5$-cyclopentadienyl) ($\eta^6$-naphthalene)Fe$^+$ X$^-$;
($\eta^5$-cyclopentadienyl) ($\eta^6$-toluene)Fe$^+$ X$^-$;
($\eta^5$-cyclopentadienyl) ($\eta^6$-cumene)Fe$^+$ X$^-$;
($\eta^5$-cyclopentadienyl) ($\eta^6$-mesitylene)Fe$^+$ X$^-$;
($\eta^5$-cyclopentadienyl) ($\eta^6$-1-methylnaphthalene)Fe$^+$ X$^-$; and bis ($\eta^6$-benzene)Cr$^+$ X$^-$; and wherein X$^-$ is selected from the group consisting of PF$_6^-$, AsF$_6^-$ and SbF$_6^-$ and mixtures thereof.

* * * * *